Patented July 24, 1923.

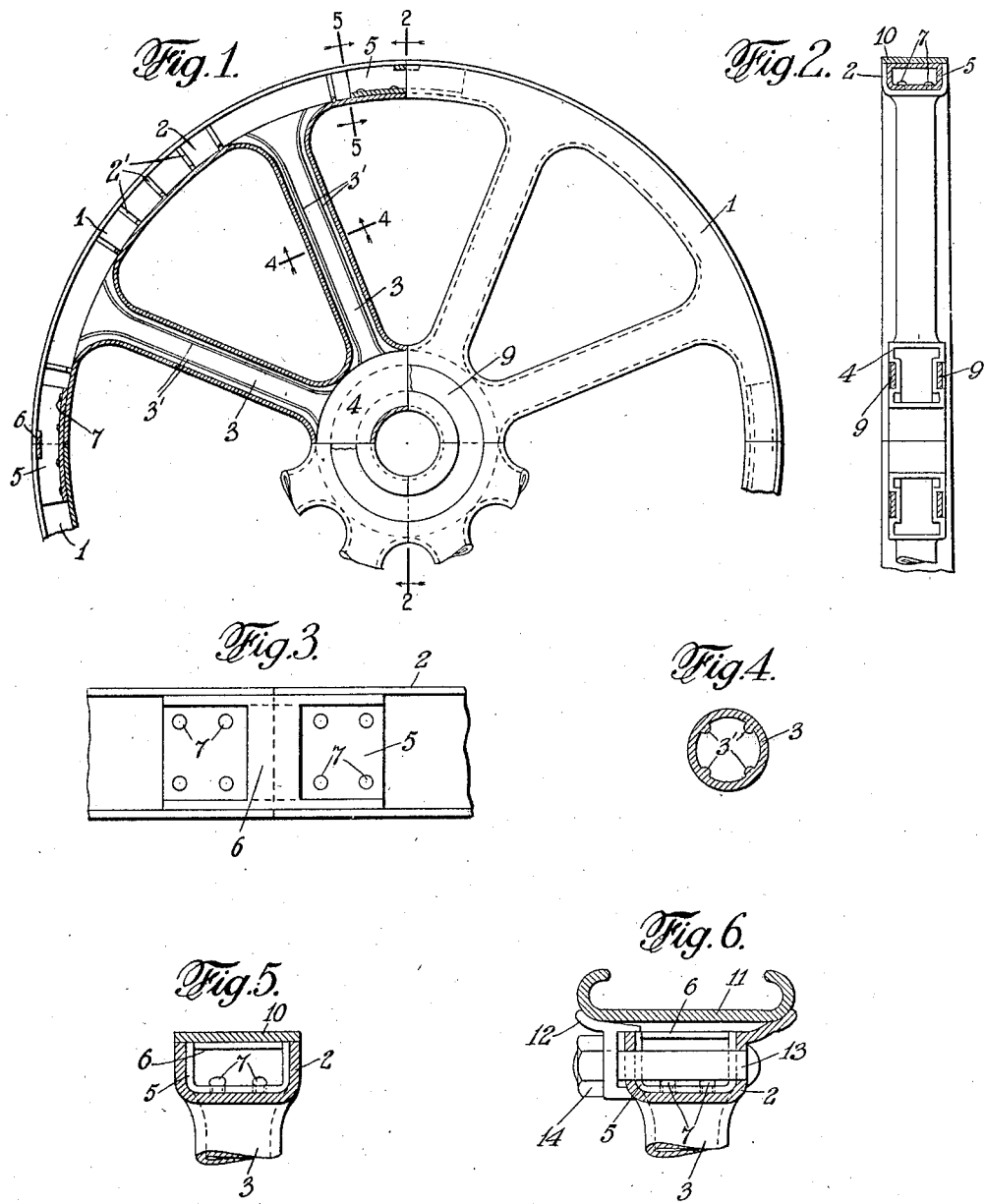

1,462,884

UNITED STATES PATENT OFFICE.

EDWARD J. DOTTERWEICH, OF SYRACUSE, NEW YORK, ASSIGNOR TO OLIVER FREDERICK CABANA, OF BUFFALO, NEW YORK.

WHEEL.

Application filed January 4, 1922. Serial No. 526,975.

*To all whom it may concern:*

Be it known that I, EDWARD J. DOTTERWEICH, a citizen of the United States, residing at Syracuse, in the county of Onondaga and State of New York, have invented new and useful Improvements in Wheels, of which the following is a specification.

My invention relates to metal wheels and more particularly to cast wheels formed with substantially sector shaped sections of malleable iron or other suitable metal. The principal object of the invention is to provide such a wheel with improved means for securing the sections together. Another object of the invention is to provide an improved reinforced cast metal wheel. Other objects and features will appear more fully in the following detailed description and the appended claims.

In order that my invention may be better understood attention is hereby directed to the accompanying drawings forming a part of this specification, in which—

Fig. 1 is a fragmentary view partly in side elevation and partly in section of a wheel containing one embodiment of my invention.

Fig. 2 is a section taken on lines 2—2 of Fig. 1.

Fig. 3 is a fragmentary plan view showing the connection between two wheel sections.

Fig. 4 is a section on line 4—4 of Fig. 1.

Fig. 5 is a section on line 5—5, Fig. 1, on an enlarged scale; and

Fig. 6 is a view similar to Fig. 5 of a modification.

The wheel shown comprises a plurality of sector-shaped sections 1, each section including a hollow felly section or part 2, hollow spokes 3 and a hollow hub section 4, all cast integrally with each other of suitable material such as iron. The spokes 3, as shown, open directly into the felly and hub sections and the felly sections are in the form of outwardly facing channels. With this construction the cores can be very easily removed from the cast wheel sections and the latter can be made very economically and to a high degree of perfection. To ensure strength and rigidity while permitting the making of a light casting with comparatively thin walls, I preferably provide the felly sections with transverse ribs 2' and the spokes with longitudinal ribs 3'. The ribs 2' and 3' are preferably placed inside the felly and spokes to permit a smooth exterior appearance to the wheel. In assembling the wheel sections, the ends of the felly sections and hub sections are ground or otherwise formed true so that adjoining wheel sections will fit closely against each other throughout the end surfaces of the hub and felly sections.

In order to firmly hold the wheel sections in proper relation to each other, as well as to reinforce the wheel, I provide connecting brace members or parts 5 each of which, as shown, is in the form of an outwardly facing channel fitting within adjoining wheel sections. Across the open side of the channel member 5 is a brace 6 connecting opposite side walls of the said member. The latter is preferably a casting of malleable iron or other suitable metal, brace 6 being cast integrally with the rest of the said member. This brace increases the resistance to collapsing of the member 5 and side walls of the felly engaged by the said member. To hold the member 5 in position I have provided projections 7 which, as shown, are cast integrally upon the longitudinal walls of each of the felly sections or parts and which are in interlocking relation with the member or part 5, the latter being preferably provided with openings through which the projections 7 pass. The part 5 is desirably secured to the felly sections as by spot welding adjacent the projections 7, which may be formed with projecting heads or otherwise to afford surplus stock at the welded spots so that weakening of the parts where the electrodes engage the metal is diminished. The above described construction for connecting the wheel sections very effectively prevents the breaking apart of the felly sections under lateral strain. It also provides simple and rigid bracing means without requiring the casting of braces upon the wheel sections proper, thereby simplifying the casting operation. It has been found that where metal wheel sections are welded together at the abutting surface of the sections, there is apt to be a distortion at these points which throws the whole wheel out of true. This objection is obviated by the construction described above as the welding is not at such abutting surfaces.

The hub sections may, if desired, be secured together in any suitable way, as by spot welding. I preferably employ connecting members such as the rings 9 secured to the walls of the hub sections for securing them together. As shown there is a continuous ring, which may be made of strong material such as steel, arranged in a channel or groove in each side hub. These rings are desirably secured to the hub sections, as by spot welding, at points spaced from the joints between the wheel sections; so that weakening or distortion of the wheel at the joints is obviated.

As shown in Figs. 2 and 5 a felly band 10 may be pressed on the felly after the wheel sections are assembled to assist in holding the wheel sections together. A demountable rim may be carried by this band. Fig. 6 shows a construction in which the band 10 is omitted but one of the flanges of the felly is extended and the demountable rim 11 rests at one side upon the felly extension and at the other side upon the well known wedges or lugs 12 which are held in position as by the bolts 13 and nut 14, the wedges being arranged in back of the nuts so as to be adjustable in position by turning up the nuts.

It is to be understood that while I have shown two embodiments of my invention changes within the scope of the appended claims may be made without departing from the spirit of my invention.

Having thus described my invention, what I claim as new and desire to secure by Letters Patent is:

1. A hollow cast metal wheel comprising substantially sector shaped sections each including a hollow felly section, a hollow spoke and a hollow hub section cast integrally with each other, the spoke extending in a generally radial direction and opening directly into the felly and hub sections, and means for securing the wheel sections in proper relation to each other and resisting collapsing of the side walls of the felly including a member having an extended surface in engagement with the adjacent end portions of adjoining felly sections and separately secured to said end portions.

2. A hollow cast metal wheel comprising substantially sector shaped sections each including an outwardly facing channel shaped felly section, a hollow spoke and a hollow hub section cast integrally with each other, the spoke section extending in a generally radial direction and opening directly into the felly and hub sections, and an outwardly facing channel shaped member fitting within and secured to adjacent end portions of adjoining felly sections to secure the same in proper relation to each other.

3. A hollow cast metal wheel comprising substantially sector shaped sections each including an outwardly facing channel shaped felly section, a hollow spoke and a hollow hub section cast integrally with each other, the spoke section extending in a generally radial direction and opening directly into the felly and hub sections, and an outwardly facing channel shaped member fitting within and secured to adjacent end portions of adjoining felly sections to secure the same in proper relation to each other, said member having a brace extending across the open side thereof to resist collapsing of the sides of the member.

4. A hollow cast metal wheel having a hollow felly and hollow spokes cast integrally with the felly and opening directly into the felly, and longitudinal channel shaped reinforcing members engaging opposite sides of the felly and secured thereto.

5. A hollow cast metal wheel having a hollow channel shaped felly and hollow spokes cast integrally with the felly and opening directly into the felly, and longitudinal channel shaped reinforcing members engaging opposite sides of the felly and secured thereto and each having a transverse brace to resist collapsing thereof and of the felly.

6. A hollow metal wheel comprising substantially sector shaped sections each including a channel shaped felly section and a spoke section, and a channel shaped connection between adjacent end portions of adjoining felly sections, said connection having a brace extending across the open side thereof to resist collapsing of the sides of the felly.

7. A hollow metal wheel comprising substantially sector shaped sections each including a channel shaped felly section and a spoke section cast integrally with each other, and a channel shaped connection between adjacent end portions of adjoining felly sections, said connection having an integral brace extending across the open side thereof to resist collapsing of the sides of the felly.

8. A hollow cast metal wheel comprising substantially sector shaped sections, each including a hollow felly part, and a connecting part coacting with adjacent ends of adjoining felly parts, one of the coacting parts having an integral projection in interlocking engagement with the other.

9. A hollow metal wheel comprising substantially sector shaped sections, each including a hollow felly part, and a connecting part coacting with adjacent ends of adjoining felly parts, one of the coacting parts having an integral projection in interlocking engagement with the other, said parts being welded together adjacent said projection.

10. A hollow cast metal wheel comprising substantially sector shaped sections, each including a hollow felly part, and a connecting part coacting with adjacent ends of adjoining felly parts, one of the coacting parts having a plurality of integral projections each in interlocking engagement with the other.

11. A hollow cast metal wheel comprising substantially sector shaped sections, each including a hollow felly part, and a channel shaped connecting part coacting with adjacent ends of adjoining felly parts and having a brace extending across the open side thereof, one of the coacting parts having an integral projection in interlocking engagement with the other.

12. A hollow cast metal wheel comprising substantially sector shaped sections each including a hollow felly section, a hollow spoke and a hollow hub section cast integrally with each other, the spoke section extending in a generally radial direction and opening directly into the felly and hub sections, a connecting member arranged within adjacent end portions of adjoining felly sections, and means for holding said member and the coacting felly section in proper relation to each other including an integral projection on one of said coacting parts in interlocking engagement with the other.

13. A hollow cast metal wheel comprising substantially sector shaped sections each including a hollow felly section, a hollow spoke and a hollow hub section cast integrally with each other, the spoke section extending in a generally radial direction and opening directly into the felly and hub sections, a connecting member arranged within adjacent end portions of adjoining felly sections, and means for holding said member and the coacting felly section in proper relation to each other including an integral projection on one of said coacting parts in interlocking engagement with the other, said parts being welded together adjacent said projection.

14. A hollow cast metal wheel comprising substantially sector shaped sections each including a hollow felly section, a hollow spoke and a hollow hub section cast integrally with each other, the spoke section extending in a generally radial direction and opening directly into the felly and hub sections, a channel shaped connecting member arranged within adjacent end portions of adjoining felly sections and having a brace extending across the open side thereof, and means for holding said member and the coacting felly section in proper relation to each other including an integral projection on one of said coacting parts in interlocking engagement with the other, said parts being welded together adjacent said projection.

15. A hollow cast metal wheel having a hollow transversely ribbed channel shaped felly and hollow spokes cast integrally with the felly and opening directly into the felly, and reinforcing channel shaped members engaging opposite sides of the felly and secured thereto.

16. A hollow cast metal wheel having a hollow transversely ribbed channel shaped felly and hollow longitudinally ribbed spokes cast integrally with the felly and opening directly into the felly, and reinforcing channel shaped members engaging opposite sides of the felly and secured thereto.

17. A hollow cast metal wheel comprising substantially sector shaped sections each having a felly section, a hollow spoke and a hollow hub section, and means fastened to adjacent hub sections at points spaced from the abutting surfaces of said sections for securing the same together.

18. A hollow cast metal wheel comprising substantially sector shaped sections each having a felly section, a hollow spoke and a hollow hub section, and a ring fastened to adjacent hub sections at points spaced from the abutting surfaces of said sections for securing the same together.

19. A hollow cast metal wheel comprising substantially sector shaped sections each having a felly section, a hollow spoke and a hub section, and means fastened to adjacent hub and felly sections at points spaced from the abutting surfaces of said sections for securing the same together.

20. A hollow cast metal wheel comprising substantially sector shaped sections each comprising a hollow felly section, a hollow spoke and a hollow hub section cast integrally with each other, the spoke extending in a generally radial direction and opening directly into the felly and hub sections and means for securing the wheel sections in proper relation to each other including a member having an extended surface in engagement with adjacent end portions of adjoining felly sections and separately secured to said end portions.

In testimony whereof, I have signed my name to this specification.

EDWARD J. DOTTERWEICH.